United States Patent [19]

Bochmann et al.

[11] Patent Number: 4,939,791

[45] Date of Patent: Jul. 3, 1990

[54] DIVERSITY RADIO RECEIVER FOR USE WITH MULTIPLE ANTENNA, PARTICULARLY CAR RADIO

[75] Inventors: Harald Bochmann, Hanover; Kurt Wiedemann, Hildesheim, both of Fed. Rep. of Germany

[73] Assignee: Blaupunkt Werke GmbH, Hildesheim, Fed. Rep. of Germany

[21] Appl. No.: 253,054

[22] Filed: Oct. 4, 1988

[30] Foreign Application Priority Data

Dec. 9, 1987 [DE] Fed. Rep. of Germany ....... 3741698

[51] Int. Cl.⁵ .............................................. H04B 7/02
[52] U.S. Cl. ..................................... 455/276; 455/137; 455/139; 455/273; 455/278
[58] Field of Search ...................... 455/132, 137–139, 455/272, 273, 276–278; 342/368, 371

[56] References Cited

U.S. PATENT DOCUMENTS 3,806,815  4/1974  Fletcher et al. ..................... 455/260
4,700,366 10/1987  Henriksson ......................... 455/139
4,710,975 12/1987  Okamoto et al. .................... 455/276
4,752,969  6/1988  Rilling .............................. 455/273
4,850,037  7/1989  Bochmann .......................... 455/276

FOREIGN PATENT DOCUMENTS

3510580  9/1986  Fed. Rep. of Germany .
8502309  5/1985  PCT Int'l Appl. .

Primary Examiner—Reinhard J. Eisenzopf
Assistant Examiner—Lisa D. Charouel
Attorney, Agent, or Firm—Frishauf, Holtz, Goodman & Woodward

[57] ABSTRACT

To increase the fidelity of radio reception in a moving receiver, for example a car radio, the signals received from various antennas on the radio are mixed with a carrier in the receiver, and the resulting mixed signals, directly and 90° phase-shifted, are added to a summing signal, in which, additionally, the phase positions of the direct and 90° phase-shifted signals are changed in dependence on the phase difference between the respective intermediate frequency mixed signal and the overall summed signal in a direction to maximize the summed signal ($u_s$).

4 Claims, 6 Drawing Sheets

Fig. 9b
PRIOR ART

DIVERSITY RADIO RECEIVER FOR USE WITH MULTIPLE ANTENNA, PARTICULARLY CAR RADIO

BACKGROUND

Quality of radio reception, particularly in the frequency modulated (FM) field, and especially stereo FM reception in automobiles is decreased by multi-path reception of signals, besides reception of stray signals, such as interfering or noise signals emanating from the ignition systems of vehicles operating close to the vehicle in which a listener wishes to receive a radio program with as little distortion and noise as possible.

Moving vehicles, such as automobiles, have constantly varying conditions of radio reception. Directional antennas, thus, cannot be used. In stationary sets, substantial improvement in quality of reception can be obtained by directional antennas which, however, unfortunately cannot be readily applied to vehicles. Rather, to permit reception regardless of the orientation of the vehicle with respect to a transmitter, antennas for vehicles are so designed that they are essentially immune to the relative orientation of the vehicle with respect to the transmitting antenna. It has been proposed to improve reception by utilizing a plurality of receiving antennas, and feed the signals from the respective antenna to a receiver, which then will be of the type known as a diversity receiver.

Diversity receivers of the prior art select the respective antenna signals solely based on field strength. The selection of the specific antenna from which this signal is obtained thus will not necessarily be that one in which the signal-to-noise ratio is the highest.

It has been previously been proposed—see German Patent Disclosure Document No. DE-OS 35 10 580 —to provide weighting coefficients, and apply the weighted coefficients to phase corrected intermediate frequency (IF) signals derived from two antennas. The signals are then combined or superposed over each other. The weighting coefficients can be controlled or adjusted. The determination of the respective weighting coefficient is made by digital control. A controller checks if small changes in the phase position of the IF signal with respect to each other results in an increase or a decrease of the overall amplitude of the IF signal. If the change results in a decrease of the overall amplitude of the IF signal, the change in phase position is reversed and a change in the opposite direction is initiated. If the change of the phase increases the amplitude, the change is continued in the same direction. Digital control of this type requires a substantial time period since the overall IF signal amplitude must also be checked. This time period becomes excessively long if the initial change of phase was in the wrong direction, that is, resulted in a decrease in the IF signal amplitude.

THE INVENTION

It is an object to provide a diversity receiver in which the lock-in to the signal, that is, the overall adjustment of the respective signals being applied to the input of the receiver, is substantially accelerated over prior-art systems, so that optimum reception can be quickly obtained.

Briefly, incoming signals from the respective antennas are mixed with a local carrier to provide individual mixed signals $u_i$, (i=1...n), in which the mixed signals can be further split to provide a pair of mixed signals $u_i$, $u_i'$ which have, respectively, 90°-phase position with respect to each other. The phases of the individual mixed signals $u_i$ can be controlled via amplitude and polarity-control of the quadrature components $u_i$ and $u_i'$. The mixed signals are applied to the summing circuit which received the individual phase control mixed signals to provide a summed signal. The summed signal is compared in individual comparators with the received and then mixed individual signals—for example with respect to each one of the phases—to determine the phase difference between the summed signal and the individual mixed signals. Based on this determination, a control signal is derived, which control signal is applied to the amplitude and polarity controllers which control: the amplitudes and polarities of the individual mixed signals—or the direct and 90°-phase-shifted components, respectively—to control the phases of the individual mixed signals as they are being applied to the summing circuit in a direction to maximize the summed signal derived from the summing circuit.

The receiver has the advantage that it is particularly adapted to receive radio waves which are modulated in accordance with various types of modulation processes, and in which the amplitude is essentially independent of the modulation signal, since what is being controlled is the phase. Thus, the receiver and the system in accordance with the invention, and the method of enhancing the signal, can be used with frequency modulated radio waves, phase modulated radio waves and/or pulse modulated radio waves. It is, of course, particularly applicable to frequency modulated radio reception.

DETAILED DESCRIPTION

Figure 1:
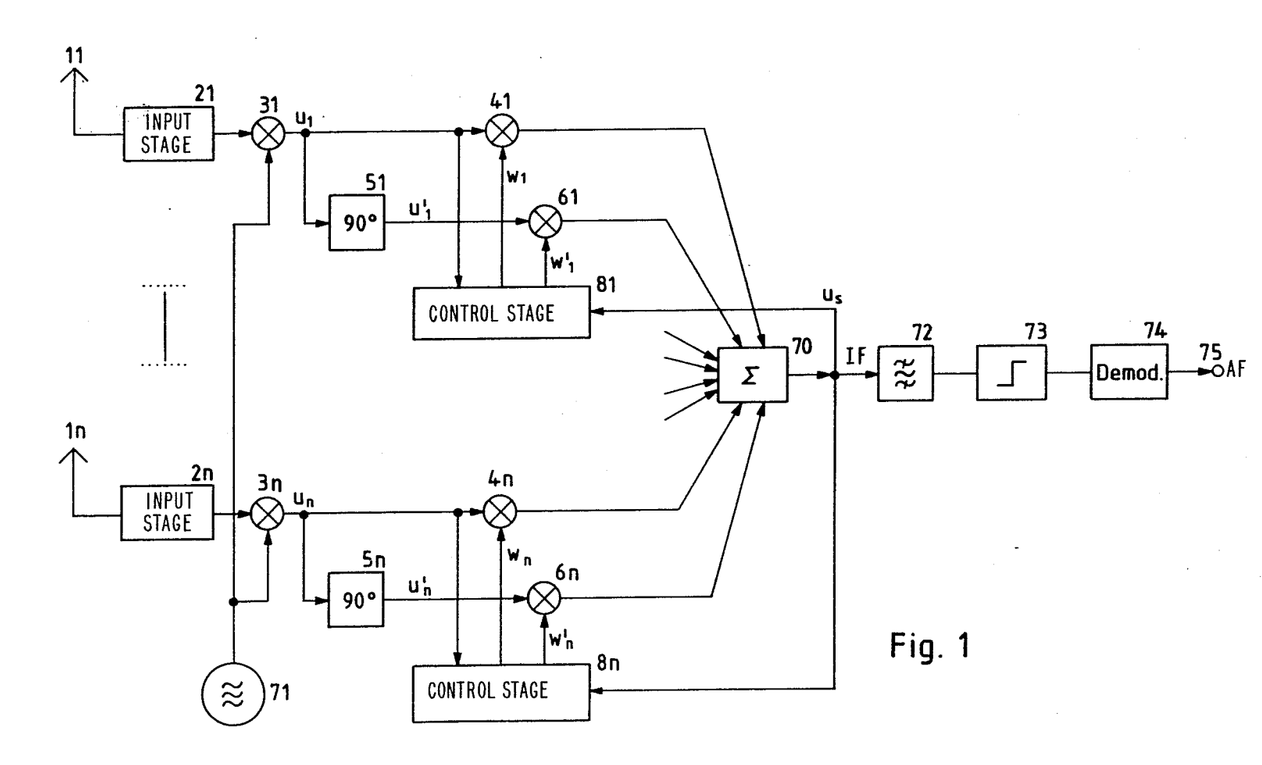
FIG. 1 is a highly schematic block circuit diagram of a portion of a radio receiver and illustrating the system of the present invention.

The circuit, in general, is shown in FIG. 1. A plurality of antennas 11 to 1n are provided on the vehicle; only two of these antennas, namely antenna 11 and antenna 1n are shown in FIG. 1. Each one of the antennas is coupled to a respective preamplifier or input stage 21...2n. The output signals from the respective input stages are connected to mixers 31...3n. Mixers 31...

3n have a signal applied thereto derived from a tunable oscillator 71. The resulting mixed signals $u_1 \ldots u_n$ are then split into two paths: a direct path, connecting the signals $u_1 \ldots u_n$ to multipliers $41 \ldots 4n$ and a phase shifting path connecting the signals $u_1 \ldots u_n$ through 90° phase shifters $51 \ldots 5n$ to multipliers $61 \ldots 6n$. The outputs from the multipliers $41 \ldots 4n$, $61 \ldots 6n$ are all applied to an adder or summing circuit 70.

The summed signal $u_s$ is applied to an intermediate frequency (IF) circuit which includes a filter 72, a limiter 73, and a demodulator 74, together with suitable amplifying circuits (not shown) to provide at an output terminal 75, demodulated audio frequency signals.

Control circuits $81 \ldots 8n$ provide multiplication coefficients to the mixed signals $u_1 \ldots u_n$ as well as to the phase-shifted mixed signals $u'_1 \ldots u'_n$, that is, the mixed signals which are phase-shifted by 90°, to provide weighting coefficients therefor. The coefficients applied to the respective multipliers $41 \ldots 4n$, $61 \ldots 6n$ include a real component $w1 \ldots wn$ and an imaginary component $w'1 \ldots w'n$, applied to the 90° phase-shifted signals by multipliers $61 \ldots 6n$. The weighting or multiplying coefficients derived from the circuits $81 \ldots 8n$, thus, may be considered as complex coefficients $w_i$.

Each one of the control units $81 \ldots 8n$, therefore, provides weighting coefficients to the respective mixed signals $u_1 \ldots u_n$, and the associated phase-shifted mixed signals $u'_1 \ldots u'_n$.

Figure 2:
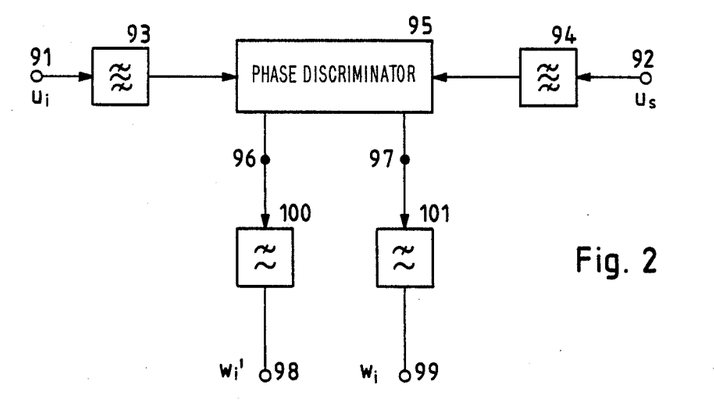
FIG. 2 is a block circuit diagram of an embodiment of the control system suitable for the receiver of FIG. 1.

FIG. 2 shows the structure of any one of the circuits $81 \ldots 8n$ in highly simplified block diagram form. In the specification, the subscript i will be used to indicate any one of the respective signals or structures $1 \ldots n$. The phase difference between the respective mixed signal $u_i$, in which $i=1 \ldots n$ and the summed signal $u_s$ is obtained by applying both signals from a respective input terminal 91 for signal $u_i$ and 92 for signal $u_s$ through bandpass filters 93, 94 to a phase discriminator 95. Bandpasses 93, 94 limit the measurement of the phase difference to the signal to be utilized, eliminating harmonics and sidebands. Bandpasses 93, 94 do influence the phase positions of the utilization signal; due to their symmetrical construction, however, the influence of the respectively applied signal is essentially the same, so that a falsification of measured results is so small as to be neglectable.

Phase discriminator 95 has two outputs 96, 97 which are, respectively, phase shifted 90° with respect to each other, and which are proportional to the sine and the cosine, respectively, of the phase angle between the input signal of the phase discriminator. Low-pass filters 100, 101 are connected to terminals 96, 97, the outputs of which form output terminals 98, 99, at which the real portion of the coefficient $w_i$ and the imaginary portion $w'_i$ are, respectively, available. Output 99, on which the real portion of the coefficient $w_i$ is available, is connected to the respective multiplication circuit $4i$, that is, that the multiplication circuits $41 \ldots 4n$; the output terminal 98 is connected to the respective multiplier $6i$, that is, $61 \ldots 6n$, for the 90° phase-shifted mixed signals, the terminals 98, 99 forming the respective output connections from the respective control unit $81 \ldots 8n$ to the respective multipliers.

As can be seen, the amplitude of the summed signal $u_s$ is not used to control the multipliers; rather, based on the respective phase difference between a mixed signal and the summed signal, the mixed signal is so rotated in phase that it positively contributes to the summed signal. No control is effected by changing the coefficient such that the summed signal will result in maximum amplitude; rather, based on the respective phase difference between the mixed signal and the summed signal, the mixed signal is so rotated in phase that it positively contributes to the summed signal.

The amplitude of the summed signal may, additionally, be evaluated, as described, for example, in German Patent Publication Document No. DE-OS 36 34 439. The arrangement and method of FIG. 2 may, thus, be used in addition to the enhancement of diversity reception as described in the aforementioned patent disclosure document. Optimum tuning to the respective program from the selected transmitter can be obtained while, additionally, those directions of reception which cause frequency selective fading or echoes are effectively suppressed. Frequency selective fading, resulting in echoes, thus can be eliminated.

Figure 3:
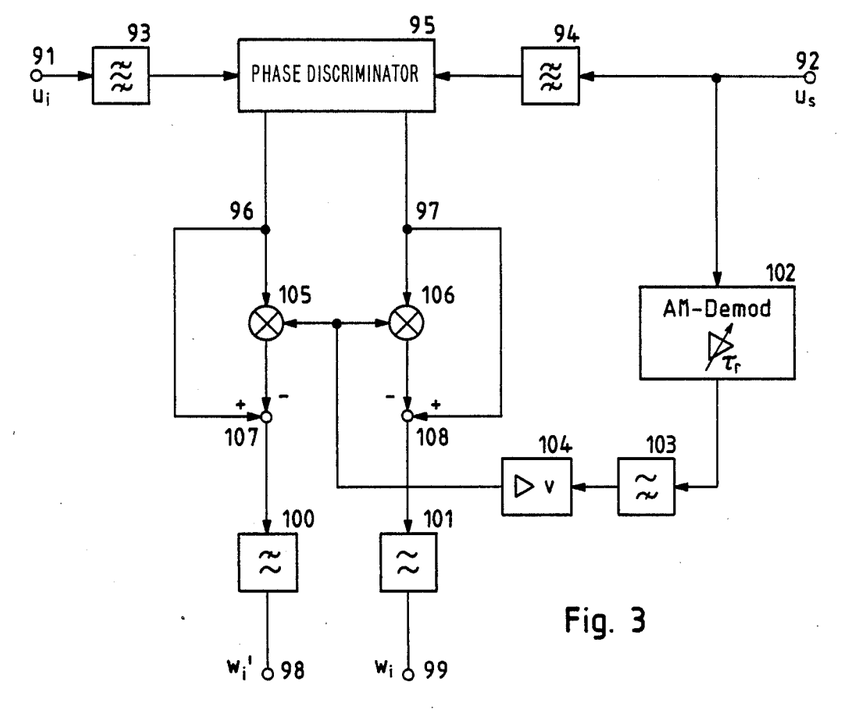
FIG. 3 is a block circuit diagram of a further and expanded embodiment of a control system.

A control system in which the amplitude of the summed signal is evaluated, in combination with discrimination with respect to phase, is shown in FIG. 3. This combination is particularly suitable.

Any one of the mixed signals $u_i$, and the summed signal $u_s$ are connected, as shown in FIG. 2, to phase discriminator 95. The summed signal $u_s$ from terminal 92 is additionally connected to an amplitude demodulator 102. The amplitude demodulator includes a controlled preamplifier. The controlled preamplifier, and the subsequently connected high-pass filter 103, together, permit determination of the degree of modulation of the summed signal essentially independently of the average signal level. The output signal of the high-pass filter 103 is amplified in an amplifier 104 by an amplification factor v and applied to two mixers 105, 106. The mixers have, additionally, the output signals 96, 97 from phase discriminator 95 (FIGS. 2 and 3) applied thereto. The output signals of the mixers 105, 106 are connected to subtraction circuits 107, 108 to be subtracted from the output signals derived, directly, from the phase discriminator 95. The result of this subtraction is, as already shown in FIG. 2, filtered in low-pass filters 100, 101 and then applied from terminals 98, 99 to the respective multipliers $41 \ldots 4n$ and $61 \ldots 6n$.

The limit frequencies of the low-pass filters 100, 101, in combination with the amplification factor v of the amplifier 104, determine the weighting with which the two different error criteria affect the locking-in course; the error criteria essentially are the phase deviation between the respective signal $u_i$ and the summed signal $u_s$ as well as the amplitude deviation of the summed signal $u_s$.

Figure 4:
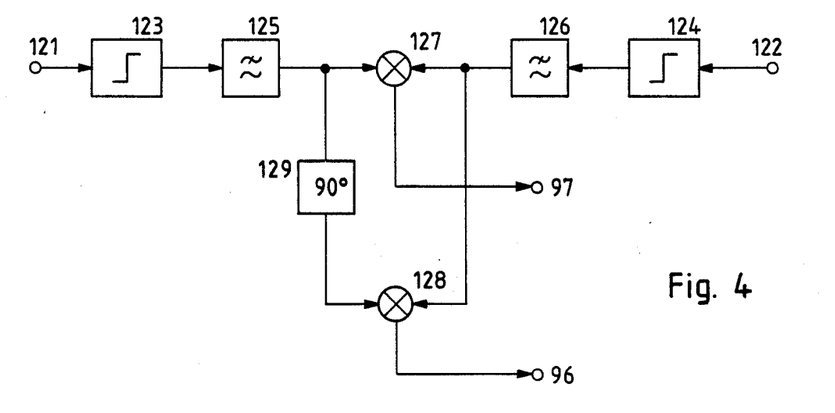
FIG. 4 is a block circuit diagram of a phase discriminator suitable for use in the receiver of FIG. 1 and in the embodiments of FIGS. 2 and 3, respectively.
Figure 5:
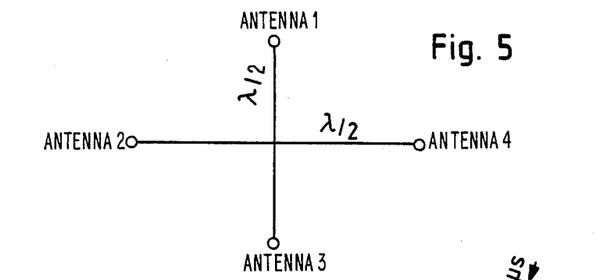
FIG. 5 is a simulation model for an antenna arrangement in a vehicle.

FIG. 4 is a schematic block circuit diagram of a phase discriminator suitable, for example, as the phase discriminator 95 of FIGS. 2 and 3. The signals to be compared are applied to input terminals 121, 122, limited in amplitude limiters 123 and 124, and then filtered in low-pass filters 125, 126. The amplitude limiters 123, 124 prevent falsification of the signals to be compared due to differences in amplitudes or variations in amplitudes. Harmonics and oscillations due to amplitude limiting are filtered by the low-pass filters 125, 126, that is, are suppressed therein.

The output signals from the low-pass filters 125, 126 are applied to two symmetrical mixers or, respectively, analog multipliers 127, 128. A 90° phase-shifting element 129 is located in advance of the input from one of the terminals, in this case terminal 121, through limiter 123 and low-pass filter 125 and the mixer 128. The output voltages of the mixers 127, 128 include a d-c voltage component which is proportional to the cosine and the sine, respectively, of the phase difference; additionally, it includes an a-c component, of a frequency twice that of signals to be compared. The a-c component is filtered by the filters 100, 101 (FIGS. 2, 3) and removed thereby.

Improvement in radio reception of receivers utilizing the present invention can best be illustrated by reference to FIGS. 5-9, in which the receiver includes the system illustrated in FIG. 3, that is, the combination of phase and amplitude control of the respective diversity-received signals. FIGS. 6 to 9 illustrate the results of the simulation, which is based on the arrangement shown in FIG. 5 of four receiving antennas. The spacing or distance of the respectively diagonally located radiators, or antennas, is about half a wave length.

Figure 6:
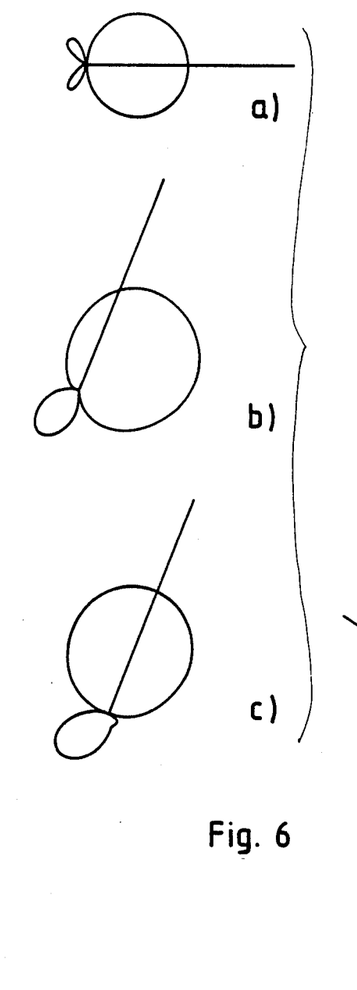
FIG. 6 illustrates antenna direction diagrams upon change of a received wave with respect to an antenna.

FIG. 6 illustrates, in three graphs—which have to be considered together—the resulting antenna direction diagrams which occur when a planar wave, arriving from the right, is received. This is the diagram which illustrates the directional diagram when the system is tuned or locked to the signal. An abrupt change of the direction of the main signal, see graph b and compare with graph a of FIG. 6, leads first to a transient directional diagram, shown in graph b only by way of example to, eventually, a stationary directional diagram as illustrated in graph c of FIG. 6.

Figure 7:
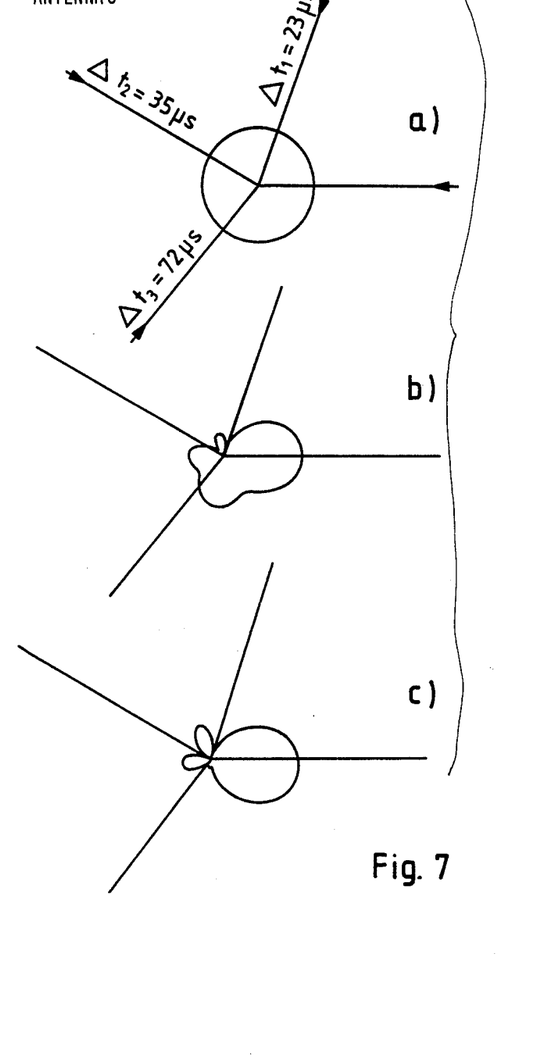
FIG. 7 in graphs corresponding to those of FIG. 6, illustrates the resulting antenna direction diagrams upon reception of a plurality of radio waves.

FIG. 7, in three aligned and associated graphs, shows the behavior or the receiver in accordance with the invention upon frequency selective fading. The portions of the straight lines characterize the amplitude as well as the direction of reception of the direct waves which are delayed with respect to each other by times $\Delta t1$ of 23 microseconds, $\Delta t2$ of 35 microseconds and $\Delta t3$ of 72 microseconds with respect to the wave received from the right. The initial value of the positioning coefficient at the beginning of the adaptation process has been arbitrarily selected. The simulation was carried out with a carrier frequency of 100 MHz, and a modulation frequency of 2 kHz, and a frequency excursion of $\pm 75$ kHz. The echoes are shown by the respective delayed signals. As can be clearly seen, the diagram of graph c of FIG. 7 is somewhat comparable to the diagram a of FIG. 6, in other words, the receiver responds most favorably to the main received signal after the transient response as illustrated in graph b of FIG. 7.

Figure 8:
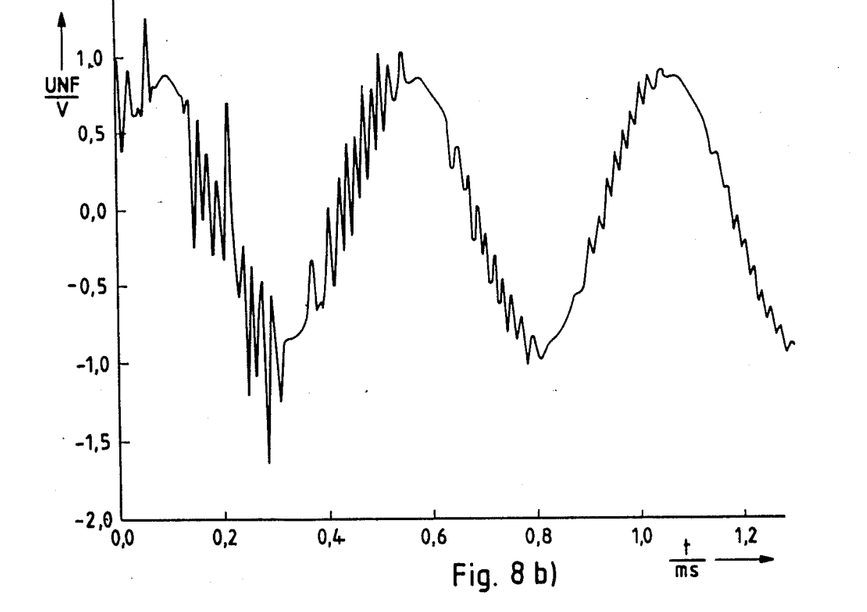
FIG. 8a is a diagram of intermediate frequency (IF) amplitude of the IF frequency level.
FIG. 8b is a diagram of the demodulated signal.
Figure 8A:
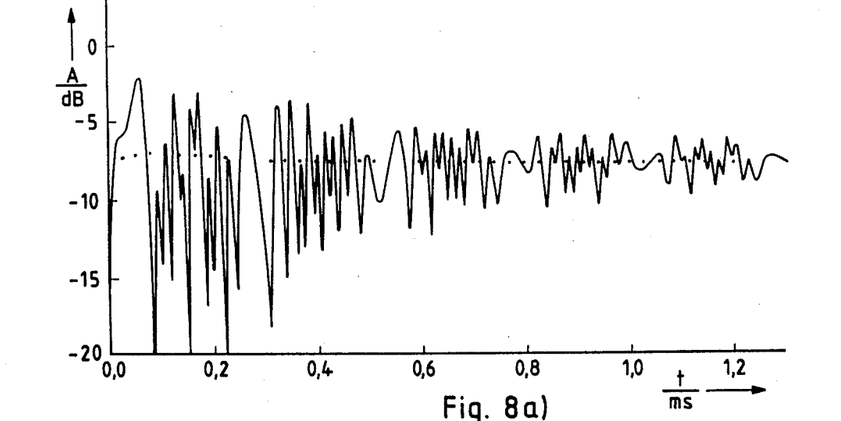
Figure 9A:
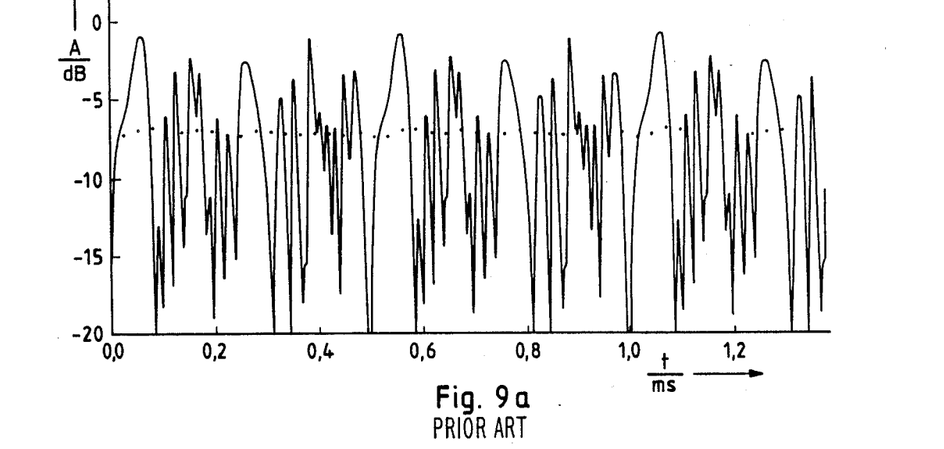
FIG. 9a is a diagram corresponding to that of FIG. 8a in a prior-art receiver.
Figure 9B:
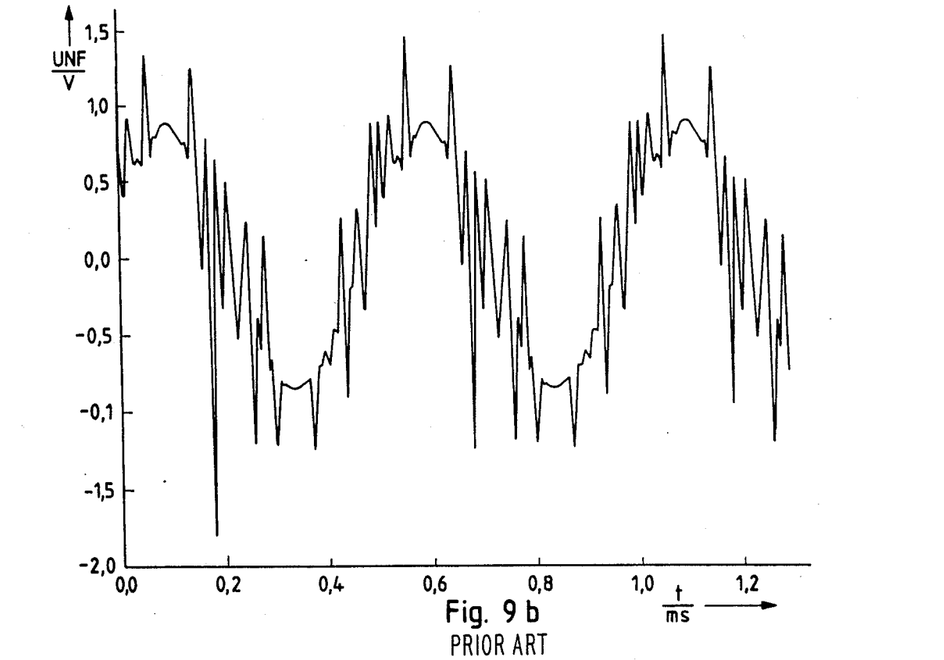
FIG. 9b is a diagram corresponding to FIG. 8b in a prior-art receiver.

FIG. 8a illustrates, with respect to time, the intermediate frequency (IF) amplitude, that is, the amplitude of the summed signal $u_s$ and, in dotted line, the IF level during locking-in or adjustment. FIG. 8b illustrates the associated demodulated signal available, for example, at terminal 75 (FIG. 1). FIGS. 9a and 9b illustrate the comparable signals in a prior art receiver without the phase control of the present invention.

As can be clearly seen from FIG. 8a, the interference will have decayed within one millisecond to a small rest value. The demodulated signal, likewise, as seen in FIG. 8b, will be essentially "clean" after one millisecond. In comparison, FIGS. 9a and 9b, in a receiver not having the features of the present invention, interference is not removed and, hence, the quality of reception remains impaired.

We claim:

1. Diversity radio receiver having
   a plurality of antenna inputs adapted for connection to individual antennas which are spaced from each other, and supplying individual incoming signals, said receiver comprising
   mixer means (31 . . . 3n) mixing the individual incoming signals received from the respective antennas (11 . . . 11n) with a local carrier and providing direct mixed signals ($u_1 \ldots u_n$)
   phase shift means (51 . . . 5n) coupled to receive the mixed signals ($u_1 \ldots u_n$) and providing mixed phase shifted signals ($u'_1 \ldots u'_n$), phase-shifted by 90° with respect to the original phase position of the individual direct mixed signals ($u_1 \ldots u_n$);
   phase control means (41 . . . 4n; 61 . . . 6n; 70; 81 . . . 8n) including multipliers (41 . . . 4n; 61 . . . 6n) coupled to the direct mixed signals and the 90° phase shifted mixed signals for controlling the phases of said mixed signals;
   summing means (70) receiving said individual phase controlled direct and 90° phase-shifted mixed signals and providing a summed signal ($u_s$);
   individual comparator and control means (81 . . . 8n) receiving the summed signals ($u_s$) and the individual mixed signals ($u_1 \ldots u_n$), for determining the phase difference between the summed signals ($u_s$) and the individual mixed signals ($u_1 \ldots u_n$) and providing a control signal to the multipliers (41 . . . 4n; 61 . . . 6n) of the phase control means representative of said difference to control the phase of the individual mixed signals being applied to the summing means (70) in a direction to maximize the summed signals ($u_s$);
   wherein said control signals provided by the individual comparator and control means (81 . . . 8n) form weighting or coefficient signals respresentative of weighting coefficients for weighting the individual mixed signals of original phase position and additionally for weighting the 90° phase shifted mixed signal by respective weighting coefficients;
   wherein the individual comparator and control means form the respective weighting or coefficient signals by comparing the phase difference between the summed signal ($u_s$) and the respective original mixed signals ($u_1 \ldots u_n$);
   wherein each of the individual comparator and control means (81 . . . 8n) includes a phase discriminator (95) having connected thereto the summed signal ($u_s$) and the individual mixed signal ($u_1 \ldots u_n$) a bandpass filter (93, 94) connected in advance of the respective inputs of the phase discriminator (95), said phase discriminator having an output terminal (96) providing a signal representative of the sine function of the phase difference between the filtered input signals and a second output terminal (97) providing a signal representative of the cosine function of said phase difference;
   and wherein respective low-pass filters (100, 101) are provided, respectively connected to the outputs from the phase discriminator and having output terminals (98, 99) coupled, respectively, to the means (41 . . . 4n; 61 . . . 6n), for controlling the phases of the individual mixed signals and applying weighting or coefficient signals ($w_i$; $w'_i$) to said phase control means.

2. The receiver of claim 1, further including a circuit responsive to signal amplitude of the summed signal and, additionally, affecting the weighting coefficient, said circuit including
   a demodulator (102) coupled to receive said summed signal ($u_s$);
   respective mixer circuits (105, 106) connected to receive the outputs from the phase discriminator (95)

and multiplying the outputs from the phase discriminator with a signal representative of the demodulated summing signal;

and subtracting means (107, 108) subtracting the signals derived from said mixing means (105, 106) from the unmixed signals derived from the phase discriminator (95), said subtracting signals being applied to said low-pass filters (100, 101).

3. The receiver of claim 2, further including a high-pass filter (103) connected between the demodulator (102) and said mixing means (105, 106).

4. In a diversity receiver, particularly to vehicular radios, such as car radios, having a plurality of antenna inputs adapted for connection to individual antennas which are spaced from each other, and supplying incoming signals, and mixer means (31 ... 3n) mixing the individual incoming signals received from the respective antennas with a local carrier (71) and providing direct mixed signals ($u_i$), wherein i=1 ... n a method of reducing diversity reception interference and fading, comprising the steps of:

deriving respectively phase-shifted mixed signals ($u_i$, $u'_i$), having a 90° phase relation with respect to each other and forming mixed direct ($u_i$) and mixed 90° shifted ($u'_i$) signals;

controlling the phases of the individual direct mixed signals ($u_i$) and the 90° phase-shifted mixed signals ($u'_i$);

and summing the individual phase controlled mixed signals and providing a summed signal ($u_s$), and wherein the step of controlling the phases of the individual mixed direct and mixed 90° phase-shifted signals comprises high-pass filtering the individual received direct and mixed 90° phase-shifted signals;

comparing the summed signals ($u_s$) and the individual mixed signals ($u_i$) to determine the phase difference between the summed signals ($u_s$) and the individual received mixed signals ($u_i$) and generating a weighting of multiplication factor control signal for controlling, respectively, the phases of the individual direct mixed signals and 90° phase-shifted mixed signals in a direction to maximize the summed signal ($u_s$);

wherein said control step comprises controlling the direct, and 90°-shifted mixed signals, respectively, by weighting factors which, respectively, are representative of the cosine and sine function of the phase difference between the summed signal and the respective individual direct and mixed 90° phase-shifted mixed signal;

further including the steps of deriving a signal representative of the amplitude of the summed signal and modifying the control signals for controlling the phases and amplitudes of the individual mixed direct and mixed 90° phase-shifted signals additionally in dependence on the amplitude of the summed signal.

* * * * *